United States Patent [19]

Igaki et al.

[11] Patent Number: 4,559,452
[45] Date of Patent: Dec. 17, 1985

[54] APPARATUS FOR DETECTING EDGE OF SEMITRANSPARENT PLANE SUBSTANCE

[75] Inventors: Seigo Igaki, Inagi; Tadao Nakakuki, Tokyo; Takefumi Inagaki; Shuetsu Oikawa, both of Kawasaki; Takashi Fujimura, Tokyo, all of Japan

[73] Assignee: Fujitsu Limited, Kawasaki, Japan

[21] Appl. No.: 498,726

[22] Filed: May 27, 1983

[30] Foreign Application Priority Data

Jun. 2, 1982 [JP] Japan .................................. 57-093046
Jul. 14, 1982 [JP] Japan .................................. 57-121292
Mar. 26, 1983 [JP] Japan .................................. 58-050642

[51] Int. Cl.$^4$ ............................................ G01N 21/86
[52] U.S. Cl. ..................................... 250/560; 250/561; 250/222.1; 356/386
[58] Field of Search ............ 250/560, 561, 221, 222.1, 250/208, 209, 205, 578; 356/381, 382, 384–387; 364/561, 562, 563; 377/24, 53

[56] References Cited

U.S. PATENT DOCUMENTS

| 3,396,278 | 8/1968 | Hjorth | 250/560 |
| 3,761,723 | 9/1973 | De Cock | 250/560 |
| 3,781,115 | 12/1973 | Rader et al. | 250/560 |
| 4,267,443 | 5/1981 | Caroll et al. | 250/560 |
| 4,313,109 | 1/1982 | Funk et al. | 250/221 |
| 4,406,996 | 9/1983 | Oka | 250/205 |

Primary Examiner—David C. Nelms
Attorney, Agent, or Firm—Staas & Halsey

[57] ABSTRACT

An apparatus for detecting an edge of a semitransparent plane substance provided with a light source array including a plurality of light sources and a photosensor array including a plurality of photosensors. A selection circuit selects a pair of one of the light sources and one of the photosensors, respectively, and a comparator circuit compares the outputs of each of the photosensors in each pair when no detected substance exists between the light source array and the photosensor array, and the corresponding outputs when a substance exists between the light source array and the photosensor array, so that the edge portion of the substance can be detected.

10 Claims, 18 Drawing Figures

APPARATUS FOR DETECTING EDGE OF SEMITRANSPARENT PLANE SUBSTANCE

BACKGROUND OF THE INVENTION (1) Field of the Invention

The present invention relates to an apparatus for detecting the edge of a semitransparent plane substance, specifically, for example, an automatic teller machine which discriminates between different types of paper currency.

(2) Description of the Prior Art

An apparatus for detecting the edge of a semitransparent plane substance is used, for example, for detecting the width, and thus, discriminating the type of, paper currency.

Since paper is semitransparent, however, it cannot completely interrupt light from a light source. Also, the thickness, design, color, and quality of the paper affect the amount of light passing therethrough. This makes precise detection of the width of paper currency of various paper qualities, designs, or colors difficult. In practice, it limits the type of currency which may be precisely detected. Also, the amount of light from the light source varies, causing variation of the light detected through the paper.

The detecting accuracy of the apparatus is further limited according to where the paper passes through the apparatus, as, usually, only a single photosensor is used to receive direct light and the light from a plurality of light sources.

SUMMARY OF THE INVENTION

An object of the present invention is to provide an apparatus for detecting the edge of a semitransparent plane substance, which can operate with a high accuracy regardless of the thickness, design, color, or quality of the substance and regardless of variations in the light from the light source or the sensitivity of the photosensors.

Another object of the present invention is to provide an apparatus which can accurately measure the width of the substance.

The above-mentioned objects can be achieved by an apparatus for detecting the edge of a semitransparent plane substance provided with a light source array including a plurality of light sources and a photosensor array including a plurality of photosensors. The apparatus includes a circuit which selects pairs of the light sources and photosensors, a circuit for driving the light-source and photosensor pair selected by the selection circuit, and a circuit which compares the outputs of the photosensors when there is no detected substance between the light source array and the photosensor array and the outputs of the photosensors when there is a detected substance between the array.

Further features and advantages of the present invention will be apparent from the ensuing description with reference to the accompanying drawings to which, however, the scope of the invention is in no way limited.

DESCRIPTION OF THE PREFERRED EMBODIMENTS

Figure 1:
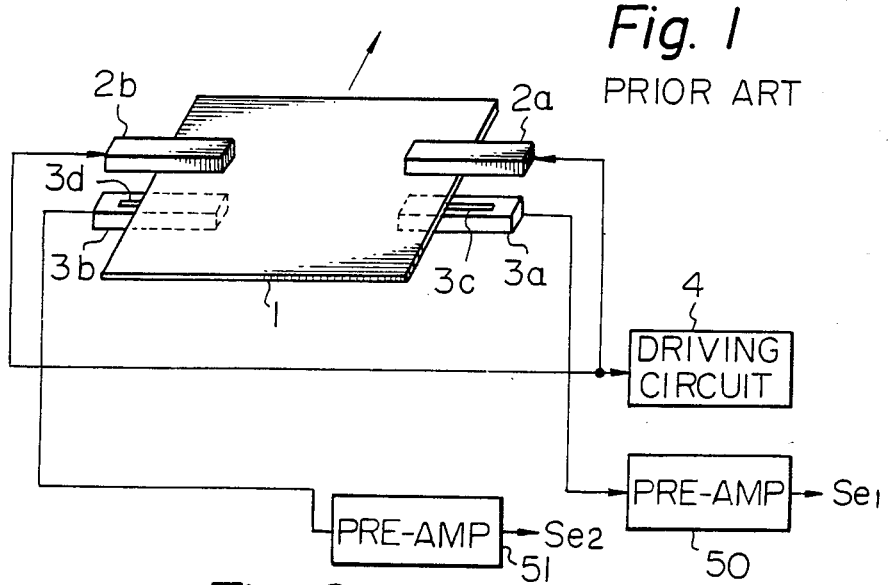
FIG. 1 is a conventional apparatus for detecting an edge of a semitransparent plane substance.

FIG. 1 is a block diagram of a conventional apparatus. In the apparatus shown in FIG. 1, light sources 2a and 2b and photosensors 3a and 3b are arranged facing each other. A piece of paper 1, for example, paper currency, is passed therebetween. The light sources 2a and 2b are driven by a driving circuit 4 so that they uniformly light-up. The light received by the photosensor 3a or 3b in slit portions 3c or 3d is converted to an electric signal by pre-amplifiers 50 or 51.

When the paper 1 moves in the direction of the arrow, the light emitted from the light sources 2a and 2b to the photosensors 3a and 3b, is interrupted. The greater the interruption of light, the smaller the output Se of the detected signal. The edge of the paper is determined by the intensity of the output of the photosensor. The edge determination by the photosensor 3a and 3b enables determination of the width of the paper 1.

Figure 2:
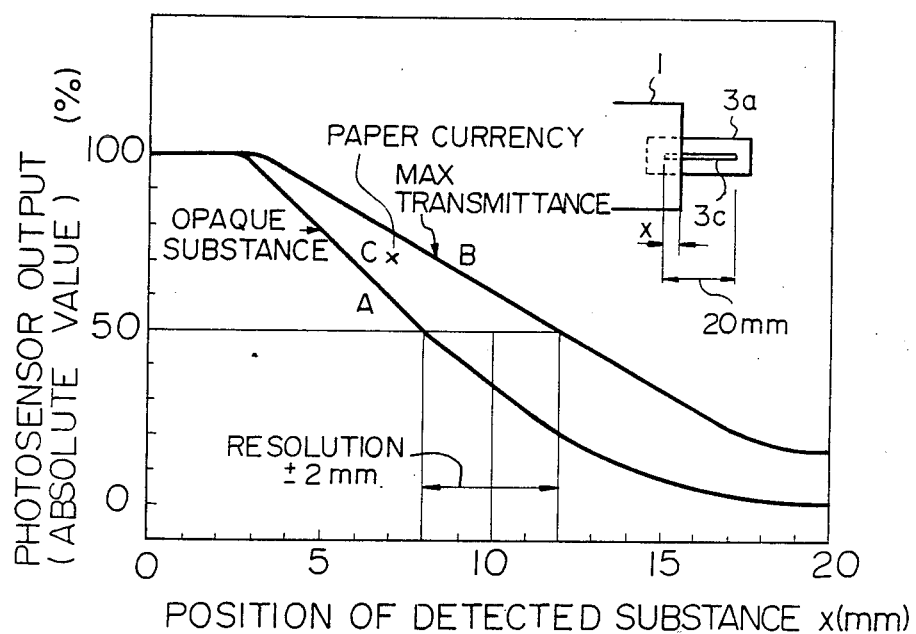
FIG. 2 is a graph of the relationship between the position of the detected substance and the output of the photosensor in the apparatus shown in FIG. 1.

FIG. 2 is a graph of the relationship between the position x of paper 1 and the output of the photosensor. In FIG. 2, curve A shows the case where paper 1 is completely opaque, and curve B shows the case where paper 1 has maximum transparency. Therefore, the edge of paper 1 is detected in region C in FIG. 2. In FIG. 2, when the length of the slit 3c is 20 mm, the resolution for detecting the edge of the paper becomes about ±2 mm. Further, at both end portions of the slit, such as x<−5 mm or x>5 mm, the sensor output does not change linearly with the position x. Therefore, the edge of the paper cannot be precisely detected.

Figure 3:
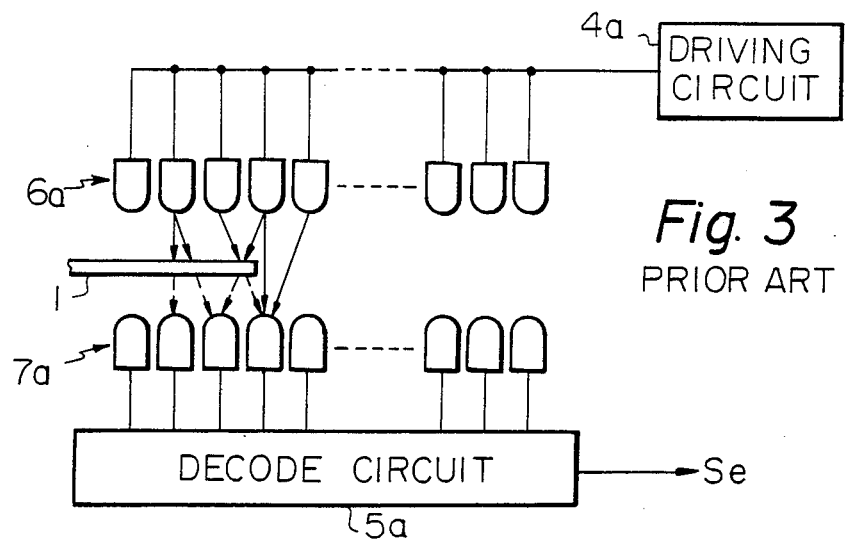
FIG. 3 is a general view of another conventional apparatus for detecting an edge of a semitransparent plane substance.
Figure 4:
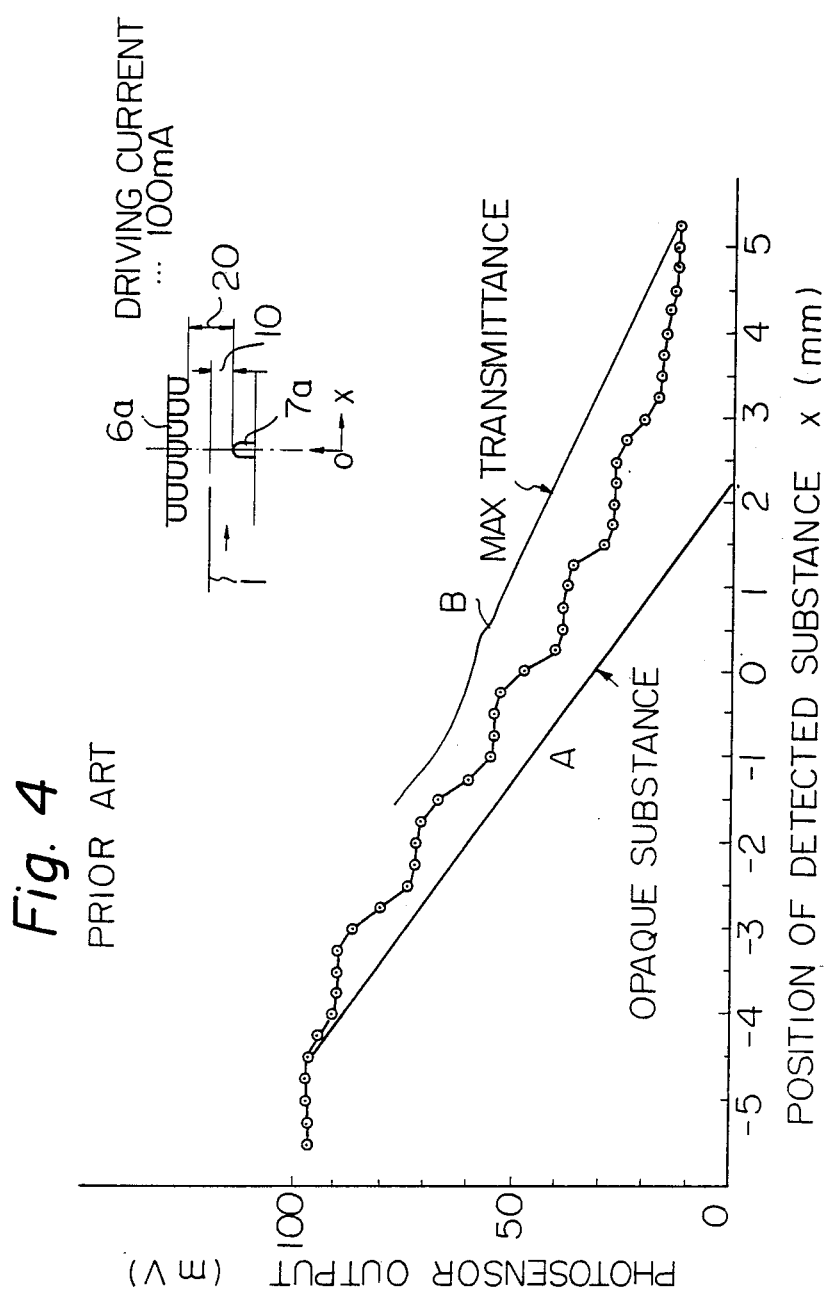
FIG. 4 is a graph of the relationship between the position of the detected substance and the output of the photosensor in the apparatus shown in FIG. 3.

FIG. 3 is another conventional apparatus. In FIG. 3, the light source array is formed by a plurality of light sources 6a, and the photosensor array is formed by a plurality of photosensors 7a. The light sources 6a are driven by a driving circuit 4a. The output of photosensors 7a is supplied to a decode circuit 5a which converts the output to an electric signal. FIG. 4 is a graph for explaining the resolution of the apparatus shown in FIG. 3. In FIG. 4, the output of the photosensors 7a is shown as a function of the position x of the paper 1 assuming that seven light sources 6a and one photosensor 7a are arranged at a distance of 20 mm and that the paper 1 is moved between them. A similar curve as in FIG. 2 is obtained for the apparatus shown in FIG. 3. In the apparatus shown in FIG. 3, the end of the paper 1 cannot be detected when inbetween light-source and photosensor pairs, i.e., not directly between a light source and corresponding photosensors. This is because the photosensor 7a receives light from many light sources 6a.

Figure 5:
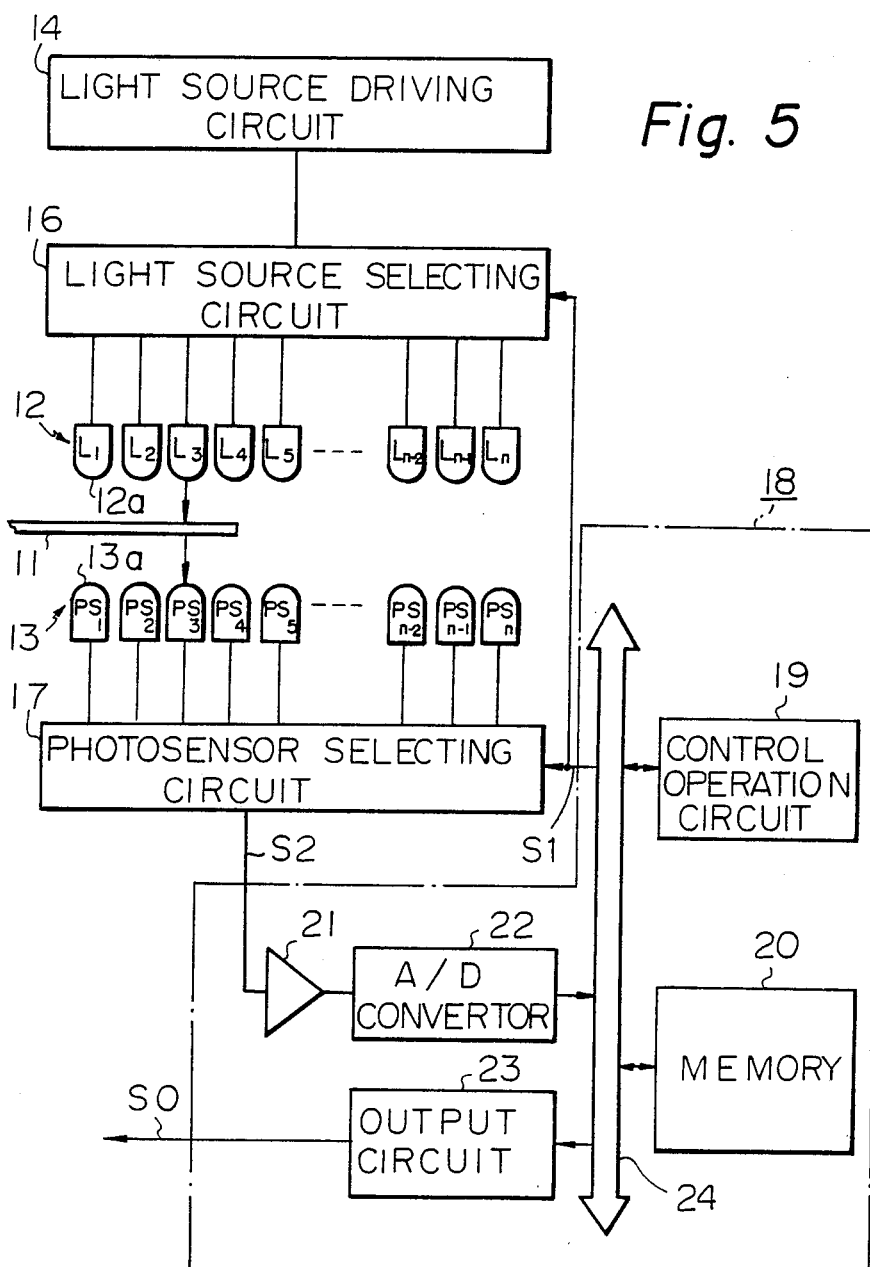
FIG. 5 is a block diagram of a first embodiment of an apparatus for detecting an edge of a semitransparent plane substance according to the present invention.

FIG. 5 is a block diagram of a first embodiment of the apparatus according to the present invention. In FIG. 5, a light source array 12, formed by a plurality of light sources $L_1$ to $L_N$ which can be independently lit, such as light emitting diodes, and a photosensor array 13, formed by a plurality of photosensors $PS_1$ to $PS_N$ from which the output can be independently selected, such as phototransistors, are arranged facing each other. Paper 11 is fed between the light sources and photosensors. A light source selecting circuit 16 is provided between the light source array 12 and a light source driving circuit 14, for independent switching of the light sources $L_1$ to $L_N$ in the light source array 12. Further, a photosensor selecting circuit 17 is connected to the photosensor array 13, for independently selecting each the outputs of the photosensors $PS_1$ to $PS_N$. A control circuit 18 supplies the selecting signal $S_1$ to the light source selecting circuit 16 and the photosensor selecting circuit 17 and receives the output signal $S_2$ from the photosensor array 13. The control circuit shown in FIG. 5 includes a control operation circuit 19, a memory circuit 20, an amplifier 21, an analog-to-digital (A/D) converter 22, an output circuit 23, and a signal bus 24.

Figure 6:
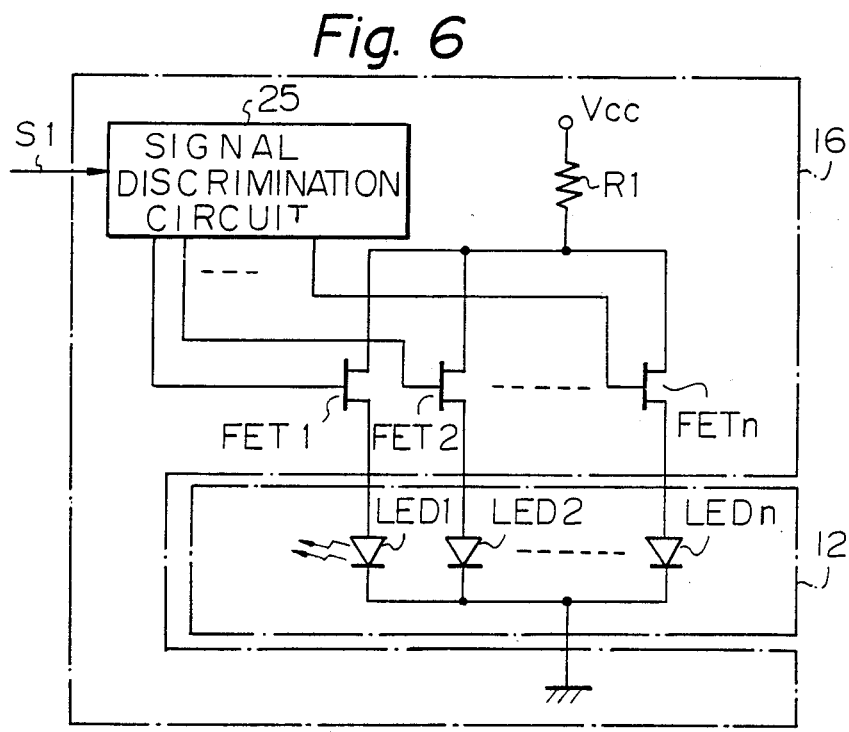
FIG. 6 is a block diagram of an embodiment of a light source selecting circuit in the apparatus of FIG. 5.

The light source selecting circuit 16 in FIG. 5 is formed, for example, as shown in FIG. 6. The selecting signal $S_1$ is applied to a signal discrimination circuit 25 which supplies gate signals to field effect transistors (FET) $FET_1$, $FET_2$, - - -, $FET_n$ used as the switching elements. By switching one of $FET_1$ to $FET_n$, the electric source $V_{CC}$ in the circuit 16 is supplied via the switched FET to one of the light emitting diodes $LED_1$, $LED_2$, - - -, $LED_n$, respectively connected in series with $FET_1$ to $FET_n$ to light the light emitting diode.

Figure 7:
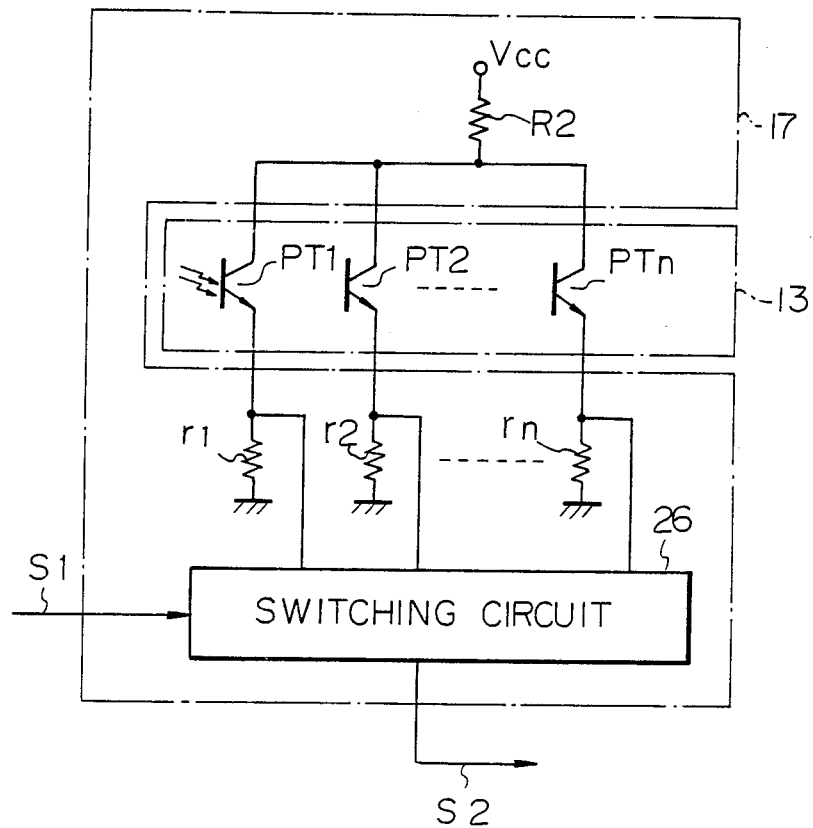
FIG. 7 is a block diagram of an embodiment of a photosensor selecting circuit in the apparatus of FIG. 5.

The sensor selecting circuit 17 in FIG. 5 is formed, for example, as shown in FIG. 7. In FIG. 7, collectors of phototransistors $PT_1$, $PT_2$, - - -, $PT_n$ in the photosensor array 13 are commonly connected via a resistor $R_2$ to the electric source $V_{CC}$ in the circuit 17. The emitters of the phototransistors $PT_1$ to $PT_n$ are independently connected to resistors $r_1$, $r_2$, - - -, $r_n$. The other ends of the resistors $r_1$ to $r_n$ are grounded. Connection points between the resistors $r_1$ to $r_n$ and the emitters of the phototransistors $PT_1$ to $PT_n$ are independently connected to a switching circuit 26 in which a plurality of switching elements, such as analog switches, are provided. Therefore, when the switching circuit 26 receives the selecting signal $S_1$, the phototransistor facing the light emitting diode receives the light, and the electric signal is output as the output signal $S_2$. The light emission diodes $LED_1$ to $LED_n$ in the light source array 12 and the phototransistors $PT_1$ to $PT_n$ are provided facing each other, respectively.

Next, the operation of the apparatus shown in FIG. 5 will be explained.

When there is no paper 1 between the light source array 12 and the sensor array 13, the signal $S_1$ which selects the first light source 12a in the light source array 12 and the first photosensor 13a in the photosensor array 13 is supplied via the signal bus 24 to the light source selecting circuit 16 and to the photosensor selecting circuit 17. Therefore, only the first light source 12a is lit. The light of the first light source 12a is received by the first photosensor 13a facing the first light source 12a. The received signal is converted to an electric signal which is then output from the photosensor selecting circuit as the received signal $S_2$.

The output $S_2$ from the photosensor selecting circuit 17 is amplified by the amplifier 21, converted to a digital value in the A/D converter 22, and supplied via the signal bus 24 to the control operation circuit 19. The signal supplied to the control operation circuit 19 is also stored in a predetermined region in the memory 20. Similar operations to the above are repeated for a second pair to an n'th pair.

One scanning cycle from the first pair to the n'th pair occurs when there is no paper 1 and the data from the light source array 12 and the photosensor array 13 are stored in the memory 20.

When there is paper 1 between the light source array 12 and the photosensor array 13, similar operations to when there is no paper 1 are repeated. The received signal from the photosensors in the photosensor array 13 is stored, in turn in, the memory 20.

After the above mentioned operations are completed, the control operation circuit 19 determines the ratio of the data between each pair when there is paper 1 and when there is no paper 1. A ratio of about "1" means that there is no paper between the light source array 12 and the photosensor array 13. A ratio lower than "1" means that there is paper 1, and that the light emitted from the light source is absorbed by the paper so that the light output is attenuated.

In FIG. 5, the light source array 12 and the sensor array 13 are shown only for the right edge of the paper, however, similar operations are actually carried out with respect to the left side of the paper too.

The distance between the right and the left parts of the photosensor array 13 and the pitch of the photosensors in the photosensor array 13 are predetermined so that the control operation circuit 19 can easily calculate the width of the paper passed therethrough. The result of the calculation is supplied via the output circuit 23 to the next apparatus (not shown) as the output signal $S_0$.

In the above operations, the error or variation of the amplifier 21 and the quantum error or variation of the A/D converter 22 can be assumed as a substantially constant value or as a small value which can be neglected.

Figure 8:
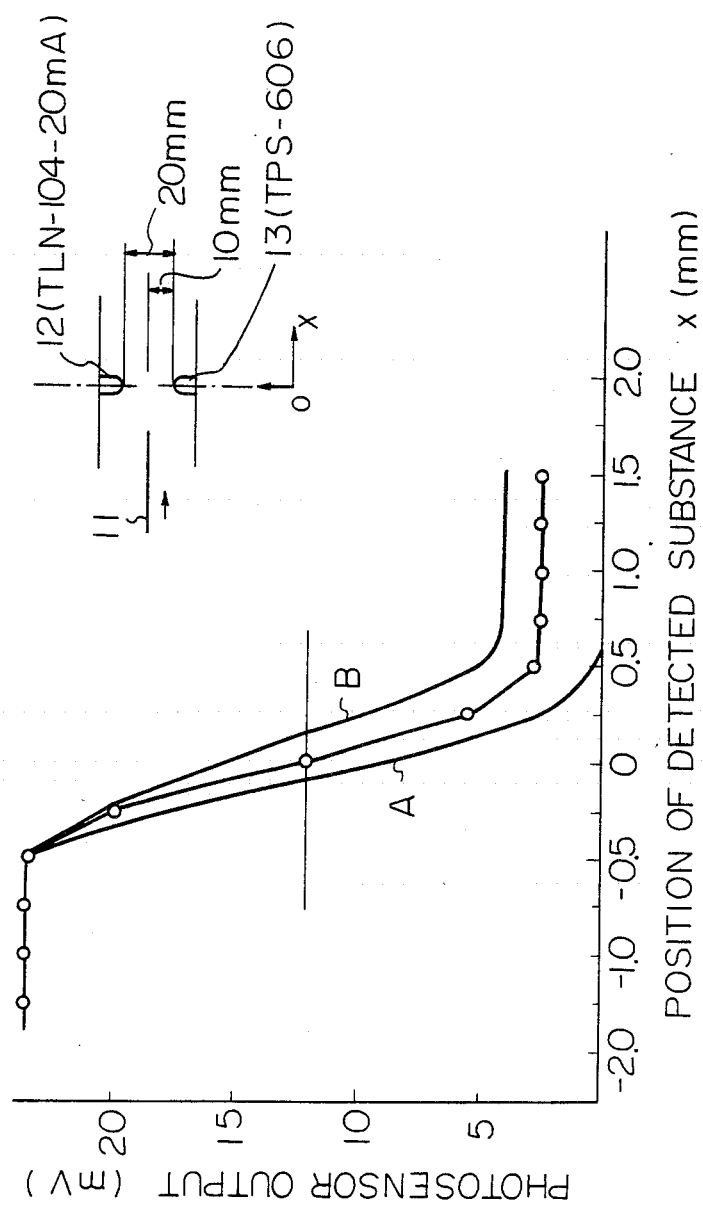
FIGS. 8, 9, and 10 are graphs of the relationship between the position of the detected substance and the output of the photosensor in the apparatus shown in FIG. 5.
Figure 9:
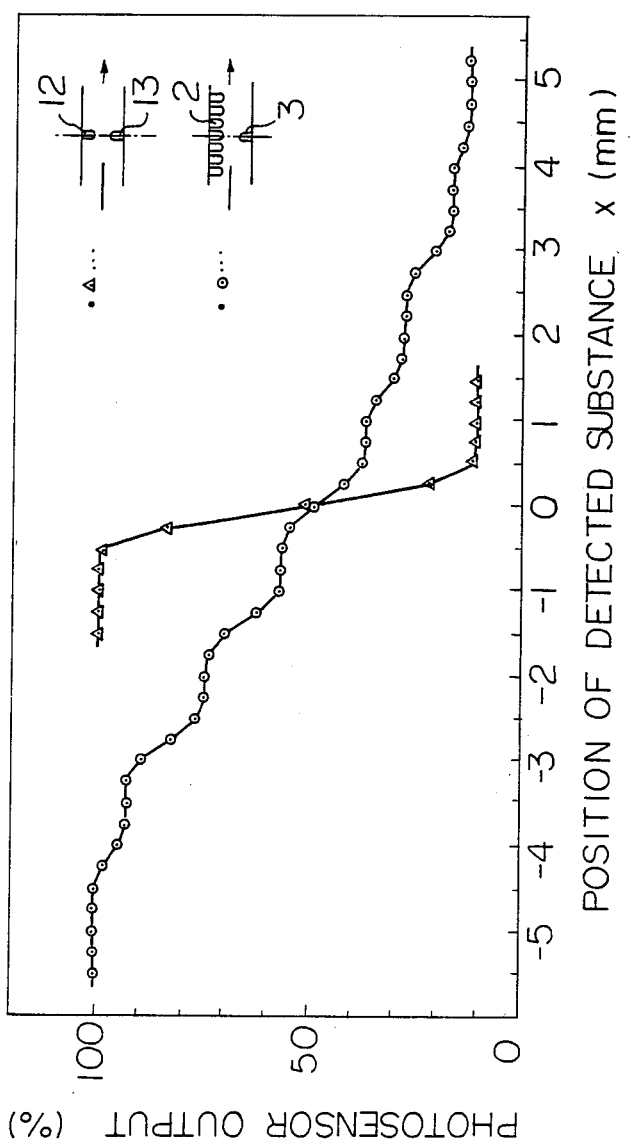

FIG. 8 shows the relation between the photosensor output and the position of the paper 11 in the apparatus shown in FIG. 5. In FIG. 8, light emitting diodes TLN-104 (20 mA) manufactured by Toshiba Ltd. and phototransistors TPS-606 also manufactured by Toshiba Ltd. are used as the light sources 12 and photosensors 13 and the distance between tops thereof is 20 mm. As shown in FIG. 8, the measuring resolution is considerably increased in comparison with FIG. 4. In FIG. 9 the resolution in FIG. 8 is superimposed over the resolution in FIG. 4.

Figure 10:
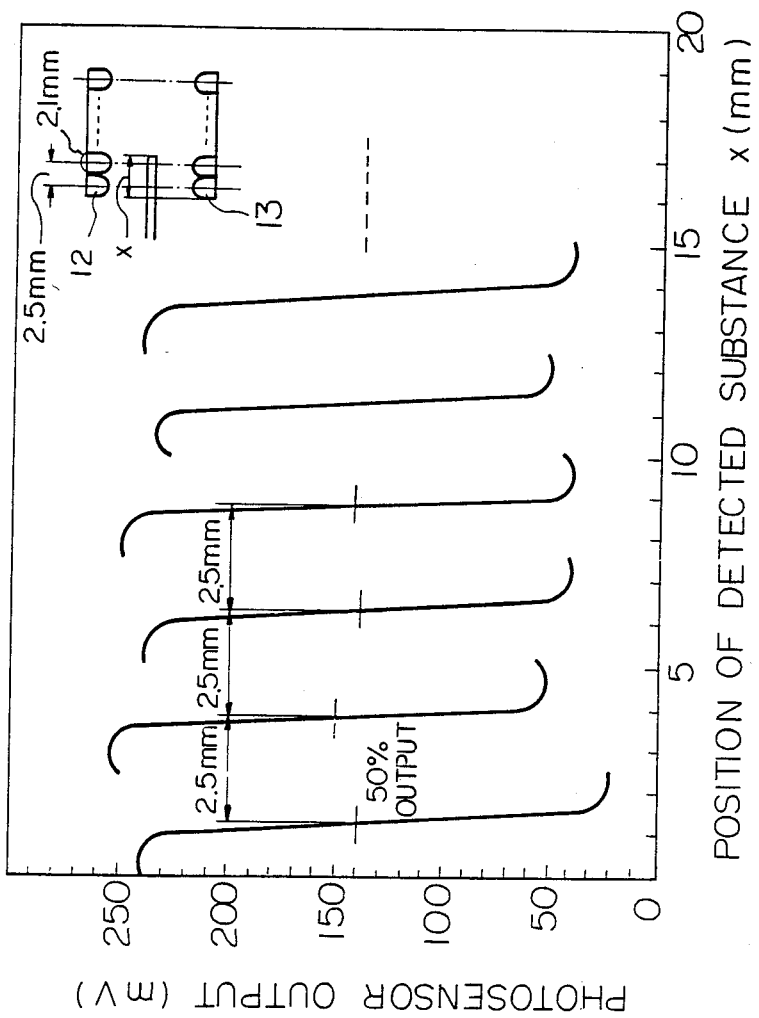

FIG. 10 is a graph the relation of the light source array 12 and the position of the paper 11 in the apparatus shown in FIG. 5. In FIG. 10, the obtained resolution is about ±1.25 mm.

As shown in FIG. 10, the data of each light source and photosensor pair vary due to the difference of the light output from the light sources and the sensitivity of the photosensors. However, this variation is no problem, because, in the present application, whether there is or is not paper is judged by the ratios of the light received when there is or is not paper for each pair.

Further, even if light sources in which the light amount decreases relatively with time, such as incandescent lamps, are used, the edge of the paper can be detected without any problem, because the ratio of the data when there is paper and when there is no paper is used.

Further, the ratio of the data when there is paper and when there is no paper is considerably different, therefore, the ratio can be detected as a digital value even when the design on the paper or the quality of the paper is different.

In the embodiment shown in FIG. 5, the position of the paper edge, that is, the width of the paper, can be detected to a degree corresponding to the accuracy of the pitch of the photosensors in the photosensor array 13. Further, in the embodiment shown in FIG. 5, the electric source capacity of the light source driving circuit can be decreased to the amount consumed by one light source.

Figure 11:
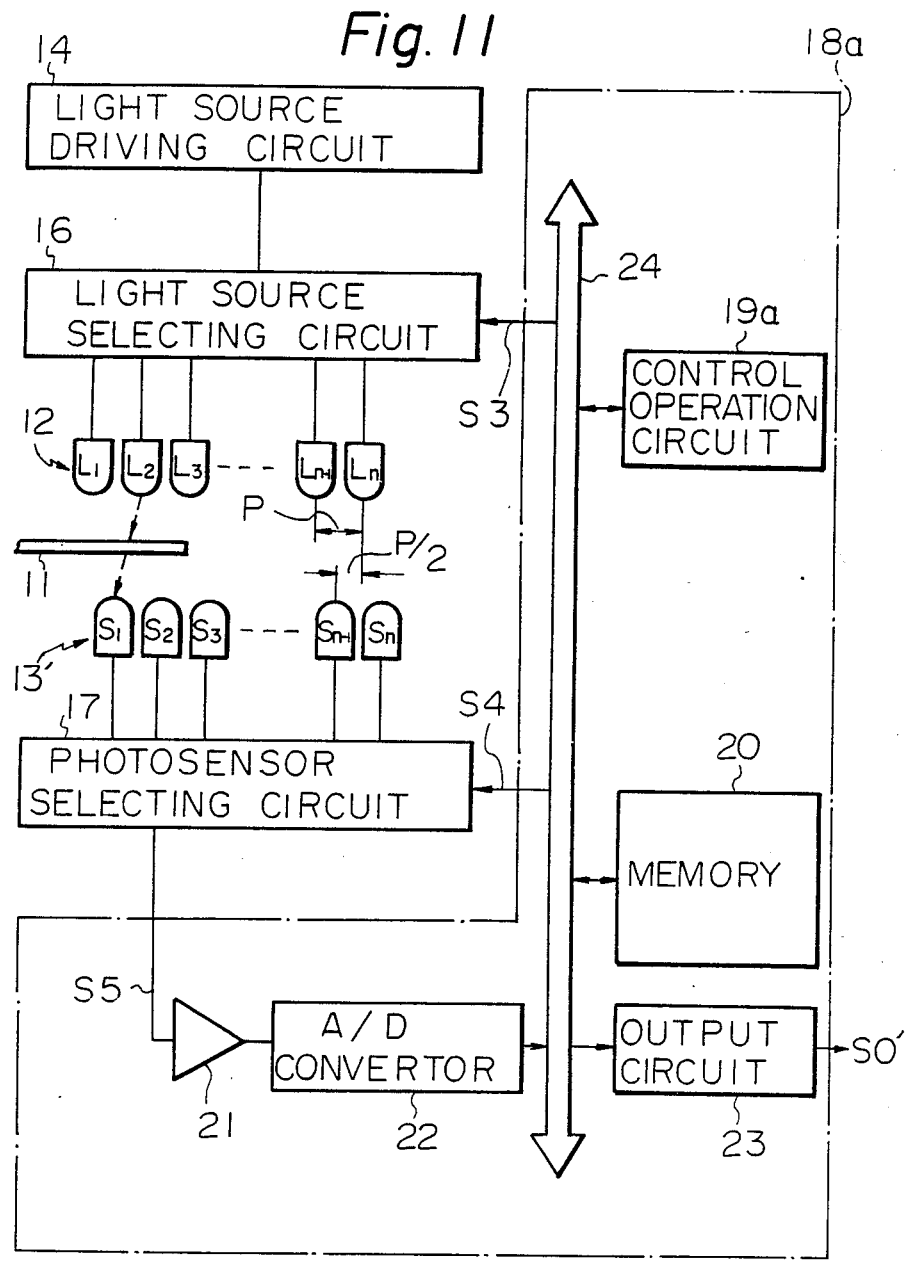
FIG. 11 is a block diagram of a second embodiment of the apparatus according to the present invention.

FIG. 11 is a second embodiment of the apparatus according to the present invention.

In the apparatus shown in FIG. 11, the photosensor array 13' is shifted a half pitch with respect to the light source array 12. The other elements are the same as those of FIG. 5, except for a control operation circuit 19a.

Figure 12:
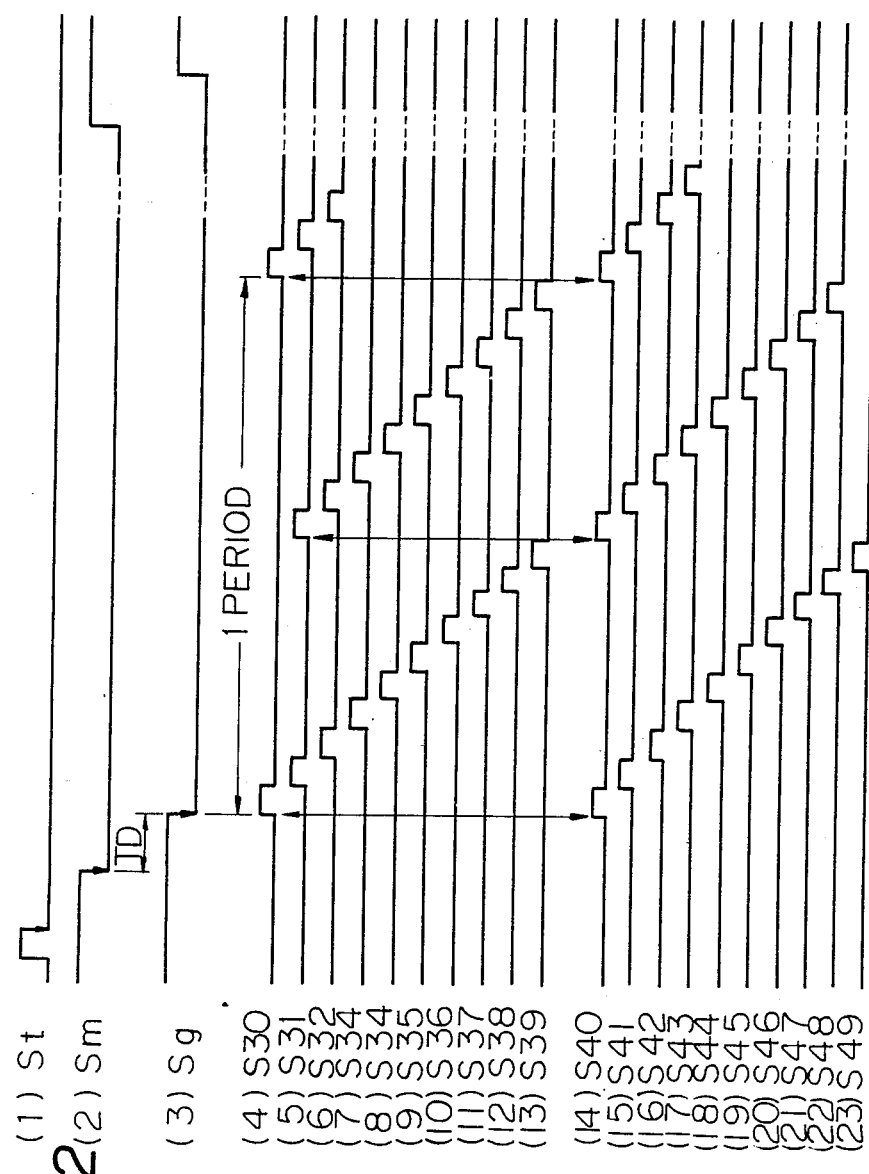
FIG. 12 is a timing-chart of the operation of the apparatus in FIG. 11.

FIG. 12 is time-chart showing the operation of the apparatus of FIG. 11 when there are ten light sources in the light source array 12 and ten photosensors in the photosensor array 13' and the selection signals $S_3$ and $S_4$ are formed by $S_{30}$ to $S_{39}$ and $S_{40}$ to $S_{49}$, respectively.

When the control operation circuit 19a in the control circuit 18a receives a start signal St from the apparatus (not shown in the drawing) and a paper pass signal Sm is output from the apparatus, a logic level of a gate signal Sg is set to "0" after a predetermined time TD. This operation is also carried out in the apparatus shown in FIG. 5.

At first, the control operation circuit 19a supplies a selection signal $S_{30}$ to the light source selecting circuit 16 for illuminating the first light source and supplies a selection signal $S_{40}$ to the photosensor selecting circuit 17 for receiving the output of the first photosensor. After the output of the first photosensor is stored in the memory 20, a similar operation is repeated until the tenth light source and the tenth photosensor are selected.

Next, a similar operation is carried out for the pairs of the second light source and the first photosensor, the third light source and the second photosensor, - - -, the tenth light source and the ninth photosensor, in that order.

In the scanning period mentioned above, except for the tenth photosensor, for example, the fifth photosensor receives two kinds of light signals, one from the fifth light source and one from the sixth light source.

The signal received when the paper passes through the array is divided by the signal obtained one period before the paper passes, so that the end of the paper is detected in a manner similar to the apparatus shown in FIG. 5.

Figure 13:
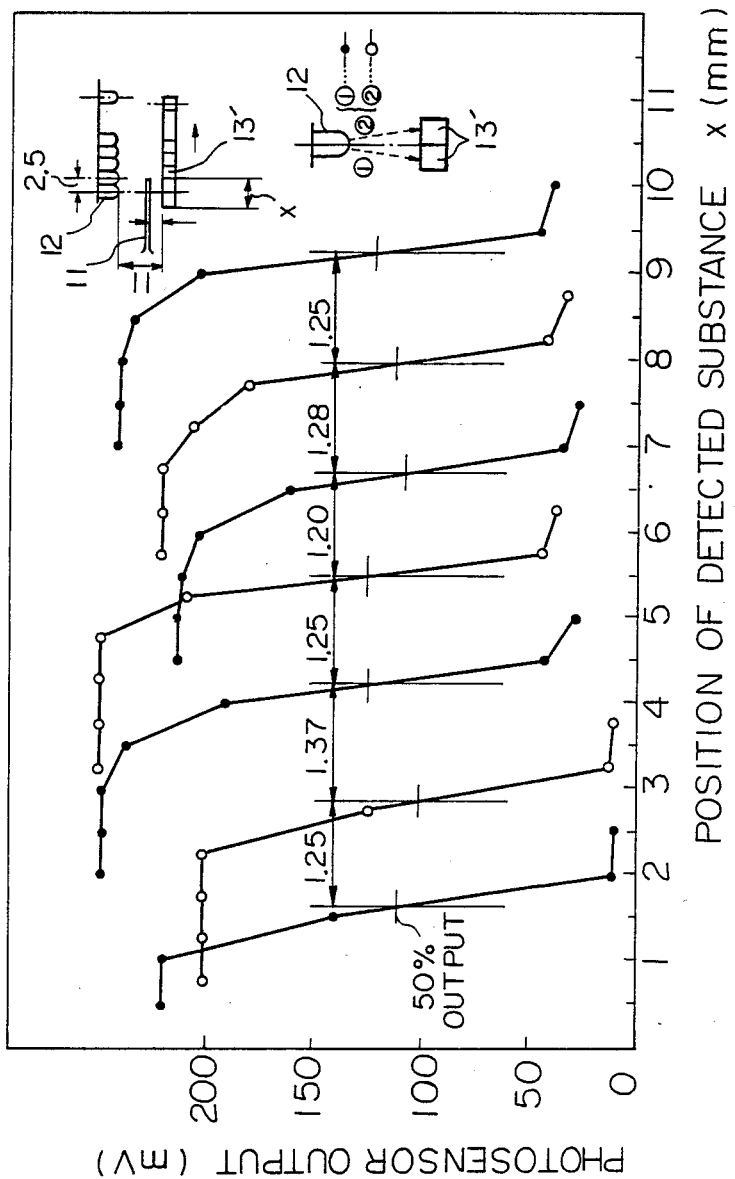
FIG. 13 is a graph of the relationship between the position of the detected substance and the output of the photosensor in the apparatus shown in FIG. 11.

In the apparatus of FIG. 11, the photosensors are shifted a half pitch with respect to the light sources so that each photosensor receives light from two light sources. Thus, the detecting accuracy of the end of the paper can be improved by twice as much, as shown in the graph of FIG. 13. In FIG. 13, the obtained resolution is about ±0.625 mm.

In the apparatuses of FIGS. 5 and 11, numerous variations can be effected. In the embodiment shown in FIG. 11, the sequence of selection of the first photosensor, the first light source; the first photosensor, the second light source; the second photosensor, the second light source; the second photosensor, the third light source; can also be effected.

Figure 14:
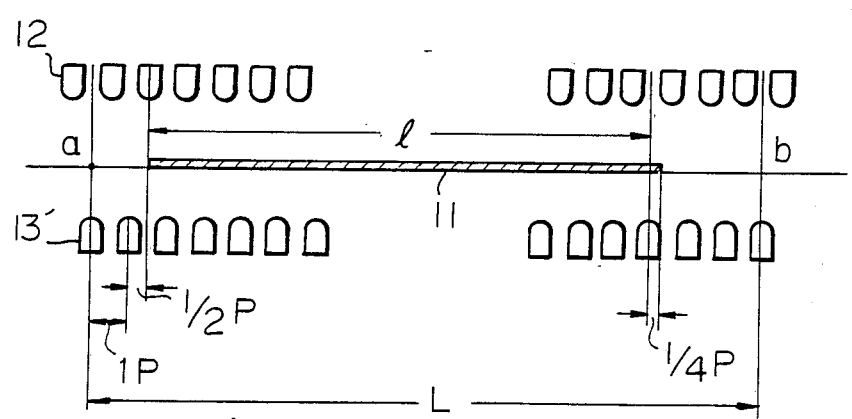
FIG. 14 is a diagram of a third embodiment of the apparatus according to the present invention.

FIG. 14 is a third embodiment according to the present invention, in which the detecting accuracy of the position of the paper becomes two times that of the apparatus shown in FIG. 11. FIG. 14 shows the relationship between the pitch of the light source array 12 and the photosensor array 13' and the width l of the paper. In FIG. 14, where a and b denote right and left standard measuring points, L denotes a distance between the left and right measuring standard points, P denotes the pitch of the light source array and the photosensor array, Δl denotes an increment of the width of the paper, and m and n denote integers, the following relation is maintained.

$$L = (l + mp) \pm \frac{P}{4}$$

$$P = \frac{\Delta l}{n}$$

That is, the accuracy of detecting the position of the edge of the paper can be improved by an amount obtained by shifting the distance L between two standard measuring points by one-fourth pitch from the sum of the width l of the paper and the pitch of the photosensors multiplied by an integer. That is, the accuracy for measuring the width of the paper is the same as that of the apparatus shown in FIG. 11, however, the accuracy for measuring the feeding position can be improved by a value of a one-fourth pitch (±¼ pitch) of the array.

Figure 15:
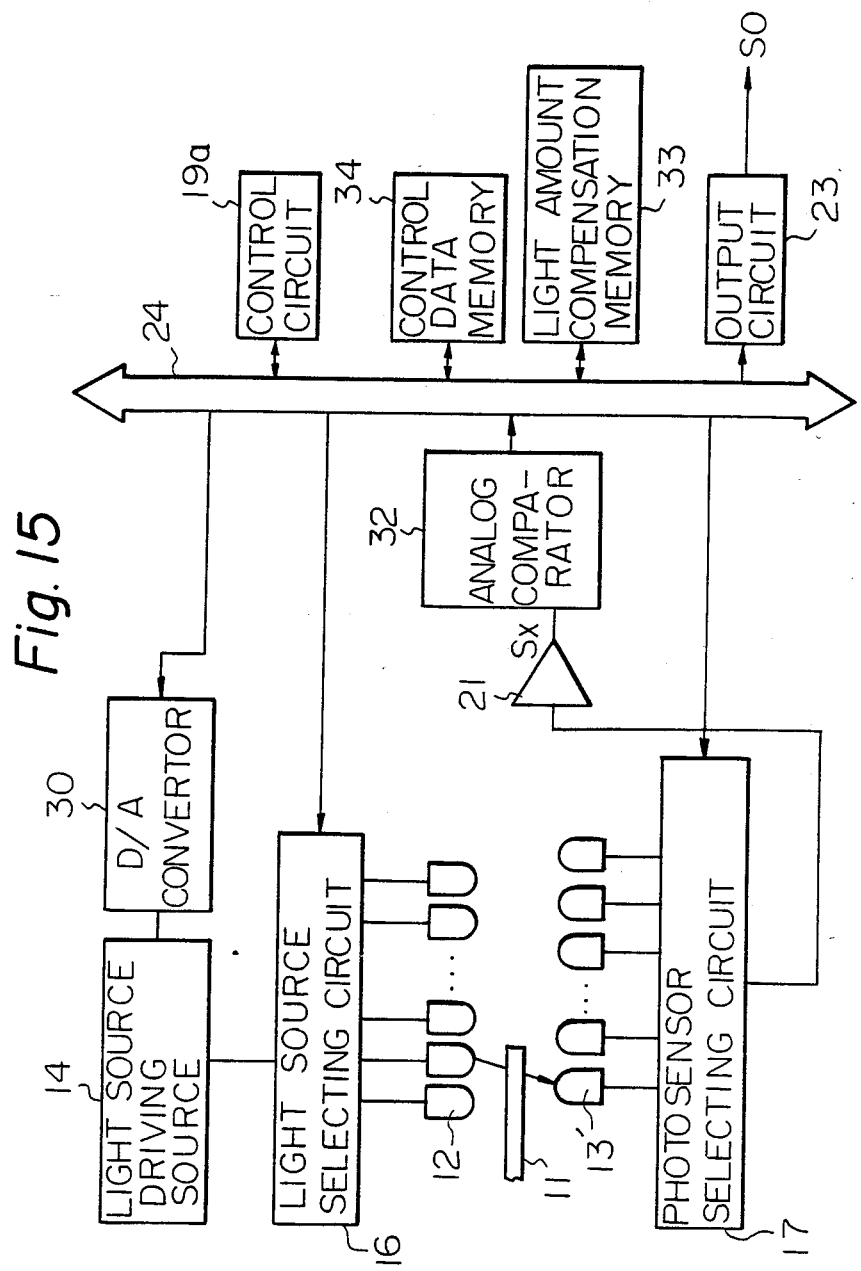
FIG. 15 is a block diagram of a fourth embodiment of the apparatus according to the present invention.

FIG. 15 is a fourth embodiment of the apparatus according to the present invention. In the apparatus shown in FIGS. 5 and 11, the analog output of the photosensor array 13 or 13' is converted by the A/D converter 22 to digital signals. However, the operation speed of the A/D converter 22 is slower than that of the light source selecting circuit 16 or the photosensor selecting circuit 17. Thus, the operation speed of the apparatus is restricted by the speed of the A/D converter 22. Further, the slice level for the output of the A/D converter is set by a program, thus the cost of the apparatus becomes high.

In the apparatus shown in FIG. 15, a digital-to analog (D/A) converter 30 is provided before the light source driving source 14, an analog comparator 32 is provided at the output of the amplifier 21, and the A/D converter is eliminated. The operation of the apparatus shown in FIG. 15 is similar to the operation of the apparatus shown in FIGS. 5 and 11 during the scanning of the light source array 12 and the photosensor array 13 or 13', however, the output current of the light source driving source 14 is controlled by the D/A converter 30.

Figure 16A:
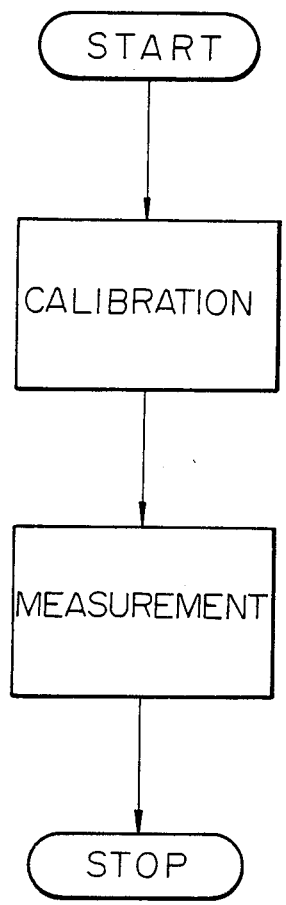
FIGS. 16A, 16B, and 16C are flow charts for explaining the operation of the apparatus shown in FIG. 15.
Figure 16B:
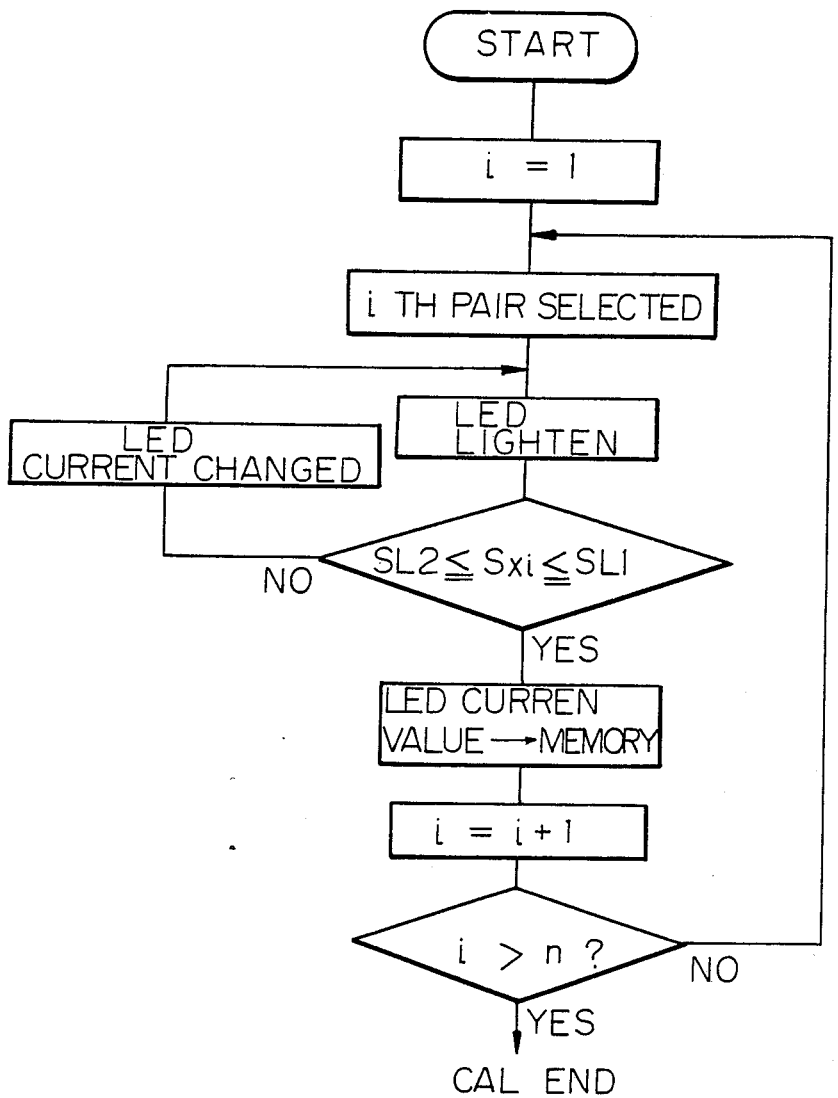
Figure 16C:
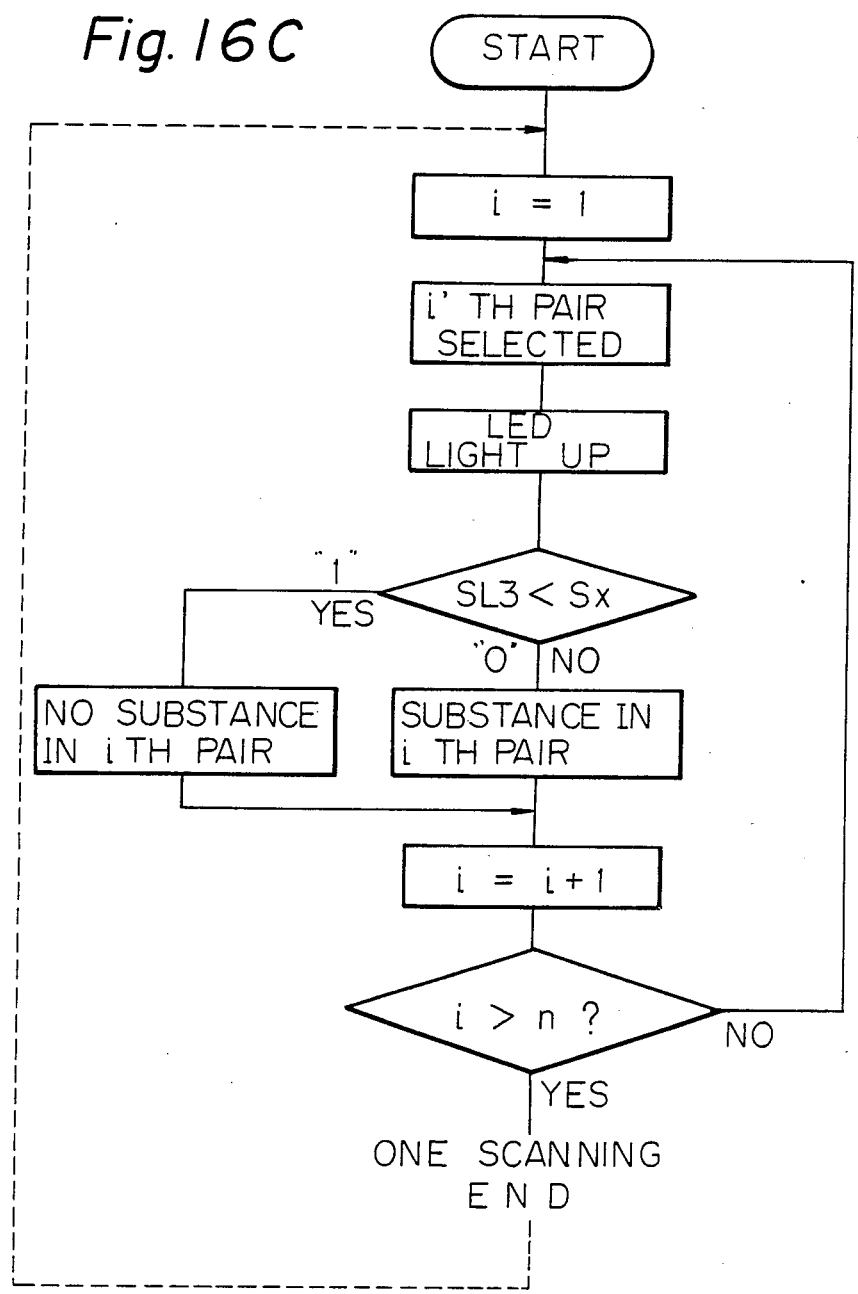

Next, the operation of the apparatus shown in FIG. 15 will be explained by referring to the flow charts of FIGS. 16A, 16B and 16C. As shown in FIG. 16A, the operation of the apparatus comprises by a calibration process and a measuring process. The former is shown in detail in FIG. 16B, and the latter is shown in detail in FIG. 16C.

During the calibration process, during the instruction of the control circuit 19a, the light source selecting circuit 16 and the photosensor selecting circuit 17 scan the light source array 12 and the photosensor array 13' when there is no paper 11. The output of the photosensor array 13' is supplied via an amplifier 21 to the analog comparator 32.

In the analog comparator 32, three reference levels, that is, $SL_1$, $SL_2$ and $SL_3$, having the relationship $SL_1 \geq SL_2 > SL_3$, are set. The output Sx of the amplifier, when the photosensor array 13' is scanned, is compared with these reference levels. During the calibration process, when there is no paper 11, the control circuit 19a supplies the control signal, which satisfies the relationship $SL_1 \geq Sx \geq SL_2$ where $SL_1 \approx SL_2$, to the D/A converter 30 so as to control the output current of the light source driving circuit 14. The control signal at this time is stored in a light amount compensation memory 33. The calibration is carried out for all light sources in the light source array 16, as shown in FIG. 16B.

During the measuring process, when there is paper 11 and when the photosensor array is scanned, the output Sx of the amplifier 21 is compared with the three reference values in the analog comparator 32. When $SL_3 < Sx$, a digital signal "1" is output. When $SL_3 \geq Sx$, a digital signal "0" is output. In accordance with these digital signals, when the output signal is "1", the control circuit 19a judges that there is no paper at the position of the photosensor. When the output is "0", the control circuit 19a judges that there is paper at the position of the photosensor. This measurement is carried out for all pairs of the array as shown in FIG. 16C.

In the above-mentioned operation, the light intensity of each light source is controlled by a control signal stored in the light amount compensation memory 33. Therefore, the value of Sx is always normalized by the state when there is no paper, that is, the condition $SL_1 \geq Sx \geq SL_2$. Therefore, the effect due to variation of the light source intensity, temperature, or sensitivity of the photosensor can be eliminated. Further, in the apparatus shown in FIG. 15, the value $SL_3$ is usually set as $$SL_3 = \tfrac{1}{2} SL_2$$

In FIG. 15, a control data memory 34 is provided for controlling the time for the operation.

As shown above, the apparatus shown in FIG. 15 provides no A/D converter. Therefore, a high speed operation of the apparatus can be effected. Further it is not necessary to slice the output of an A/D converter by a program or to compare the digital signal obtained by the slice with a reference value stored in a memory. This simplifies the apparatus and enables processing at a high speed.

As mentioned above, the apparatus according to the present invention can detect the edge of a semitransparent plane substance with a high accuracy regardless of the substance's dimensions, quality, or design, and also regardless of the variation from the light of the light source or the sensitivity of the photosensors. Further, the apparatus according to the present invention can improve the measuring accuracy and the measuring speed of the width of the plane substance.

We claim:

1. An apparatus for detecting an edge of a semitransparent plane substance provided with a light source array including a plurality of light sources and a photosensor array including a plurality of photosensors having outputs, comprising:

means, operatively connected to the light source array and said photosensor array, for selecting a light source and photosensor pair and for providing a selection signal;

means, operatively connected to said selecting means, for driving the selected light source and photosensor pair; and means, operatively connected to said photosensor array, for comparing the outputs of each of the plurality of photosensors, when the semitransparent plane substance between the light source array and the photosensor array is not detected, with the corresponding outputs of each of the plurality of photosensors when the semitransparent plane substance between the light source array and the photosensor array is detected, thereby detecting the edge portion of the semitransparent plane substance.

2. An apparatus for detecting an edge of a semitransparent plane substance according to claim 1, wherein each of the plurality of light sources and each of the plurality of photosensors has a light path which is at an angle to the semitransparent plane substance, wherein the light path of each of the plurality of light sources and the light path of each of the plurality of photosensors are arranged to coincide, and wherein said selecting means selects as a pair, one of the plurality of light sources and one of the plurality of photosensors positioned on the same light path.

3. An apparatus for detecting an edge of a semitransparent plane substance according to claim 1, wherein there are M light sources and M photosensors, where M is an integer greater than one, the photosensor array and the light source array extending parallel to the semitransparent plane substance, wherein each one of the plurality of light sources emits light and each of the plurality of photosensors generates a signal upon receipt of the light from a respective light source, wherein each of the plurality of light sources and each of the plurality of photosensors has a light path which is at an angle to the semitransparent plane substance, wherein the light path of each of the plurality of light sources and the light path of each of the plurality of photosensors is shifted from each other, and wherein said selecting means first, selects a Jth light source and a Jth photosensor as a pair, where J is an integer less than or equal to M, a Jth+1 light source and a Jth+1 photosensor as a pair, for the Jth to the J=M light sources, and second, selects the Jth+1 light source and the Jth photosensor as a pair, a Jth+2 light source and the Jth+1 photosensor as a pair, for the Jth to the J=M light sources.

4. An apparatus for detecting an edge of a semitransparent plane substance according to claim 1, wherein there are M light sources and M photosensors, where M is an integer greater than one, the photosensor array and the light source array extending parallel to the semitransparent plane substance, wherein each of the plurality of light sources emits light and each of the plurality of photosensors generates a signal upon receipt of the light from a respective light source, wherein each one of the plurality of light sources and each one of the plurality of photosensors has a light path which is at an angle to the semitransparet plane substance, wherein the light path of each of the plurality of light sources and the light path of each of the plurality of photosensors are arranged to be shifted from each other and wherein said selecting means selects a Jth light source and a Jth photosensor as a pair, where J is an integer less than or equal to M, the Jth photosensor and a Jth+1 light source as a pair, the Jth+1 light source and a Jth+2 photosensor as a pair, for the Jth to the J=M light sources.

5. An apparatus for detecting an edge of a semitransparent plane substance according to claim 1, wherein the light source array and the photosensor array have standard right and left measuring points, wherein P denotes a pitch of the light sources and the photosensors, L denotes a width between the standard right and left measuring points, l denotes a width of the semitransparent plane substance, Δl denotes an increment of the width of l, and m and n denote integers, the relationship between P, L, l, Δl, m and n being expressed by the following equation:

$$L = (l + mp) \pm \frac{P}{4}, \text{ where } p = \frac{\Delta l}{n}$$

6. An apparatus for detecting an edge of a semitransparent plane substance according to claim 1, wherein said driving means comprises:
- a control operation circuit, operatively connected to said selecting means;
- a signal bus, operatively connected to said control operation circuit and said selecting means, for supplying the selection signal to said selecting means;
- an analog-to-digital circuit, operatively connected to said means for comparing, for converting an analog value of the outputs of each of the plurality of photosensors to digital values and for supplying the digital values to said control operation circuit; and
- a memory, operatively connected to said signal bus, for storing the digital values of said analog-to-digital circuit when the semitransparent plane substance is not detected.

7. An apparatus for detecting an edge of a semitransparent plane substance according to claim 1, wherein said driving means comprises:
- a control operation circuit operatively connected to said selecting means;
- a signal bus, operatively connected to said control operation circuit and said selecting means, for supplying the selection signal to said selecting means;
- a digital-to-analog circuit having analog reference levels, operatively connected to said signal bus, for controlling the output current of the plurality of light sources;
- an analog comparator circuit, operatively connected to said comparing means and said signal bus, for comparing the outputs of the photosensors with the analog reference levels; and
- a light amount compensation memory, operatively connected to said signal bus, for storing the output of the analog comparator circuit when the semitransparent plane substance is not detected.

8. An apparatus for detecting an edge of a semitransparent plane substance according to claim 3, wherein said driving means comprises:
- a control operation circuit operatively connected to said selecting means;
- a signal bus, operatively connected to said control operation circuit and said selecting means, for supplying the selection signal to said selectig means;
- an analog-to-digital circuit, operatively connected to said means for comparing, for converting an analog value of the outputs of each of the plurality of photosensors to digital values and for supplying the digital values to said control operation circuit; and
- a memory, operatively connected to said signal bus, for storing the digital values of said analog-to-digital circuit when the semitransparent plane substance is not detected.

9. An apparatus for detecting an edge of a semitransparent plane substance according to claim 4, wherein said driving means comprises:
- a control operation circuit operatively connected to said selecting means;
- a signal bus, operatively connected to said control operation circuit and said selecting means, for supplying the selection signal to said selecting means;
- an analog-to-digital circuit, operatively connected to said means for comparing, for converting an analogue value of the outputs of each of the plurality of photosensors to digital values and for supplying the digital values to said control operation circuit; and
- a memory, operatively connected to said signal bus, for storing the digital values of said analog-to-digital circuit when the semitransparent plane substance is not detected.

10. An apparatus for detecting an edge of a semitransparent plane substance according to claim 4, wherein said driving means comprises:
- a control operation circuit operatively connected to said selecting means;
- a signal bus, operatively connected to said control operation circuit and said selecting means, for supplying the selection signal to said selecting means;
- a digital-to-analog circuit having analog reference levels, operatively connected to said signal bus, for controlling the output current of the plurality of light sources;
- an analog comparator circuit, operatively connected to said means for comparing and said signal bus, for comparing the outputs of the photosensors with the analog reference levels, and
- a light amount compensation memory, operatively connected to said signal bus, for storing the output of the analog comparator circuit when the semitransparent plane substance is not detected.

* * * * *